(12) United States Patent
Chouard et al.

(10) Patent No.: US 8,104,708 B2
(45) Date of Patent: Jan. 31, 2012

(54) SUSPENSION FOR MOUNTING A TURBOJET ENGINE ON AN AIRCRAFT

(75) Inventors: Pierre-Alain Jean-Marie Philippe Hugues Chouard, Paris (FR); Guillaume Lefort, Paris (FR)

(73) Assignee: SNECMA, Paris (FR)

( * ) Notice: Subject to any disclaimer, the term of this patent is extended or adjusted under 35 U.S.C. 154(b) by 594 days.

(21) Appl. No.: 12/329,136

(22) Filed: Dec. 5, 2008

(65) Prior Publication Data
US 2011/0001002 A1 Jan. 6, 2011

(30) Foreign Application Priority Data
Dec. 7, 2007 (FR) ...................................... 07 08556

(51) Int. Cl.
*F02C 7/20* (2006.01)
(52) U.S. Cl. .............. 244/54; 60/796; 248/554
(58) Field of Classification Search .............. 244/54, 244/55; 60/796–797; 248/554–557
See application file for complete search history.

(56) References Cited

U.S. PATENT DOCUMENTS

| | | | | |
|---|---|---|---|---|
| 4,266,741 | A * | 5/1981 | Murphy | 244/54 |
| 5,238,206 | A | 8/1993 | Pachomoff | |
| 5,860,623 | A * | 1/1999 | Dunstan et al. | 244/54 |
| 5,873,547 | A * | 2/1999 | Dunstan | 244/54 |
| 6,398,161 | B1 * | 6/2002 | Jule et al. | 244/54 |
| 7,021,585 | B2 * | 4/2006 | Loewenstein et al. | 244/54 |
| 7,063,290 | B2 * | 6/2006 | Marche | 244/54 |
| 7,232,091 | B2 * | 6/2007 | Marche | 244/54 |
| 2007/0138337 | A1 * | 6/2007 | Audart-Noel et al. | 244/53 R |
| 2009/0184197 | A1 * | 7/2009 | Cloft | 244/54 |
| 2009/0189014 | A1 * | 7/2009 | Balk | 244/54 |
| 2009/0218441 | A1 * | 9/2009 | Marche | 244/54 |
| 2009/0314881 | A1 * | 12/2009 | Suciu et al. | 244/54 |

FOREIGN PATENT DOCUMENTS

| | | |
|---|---|---|
| EP | 0 527 672 A1 | 2/1993 |
| EP | 1 493 663 A1 | 1/2005 |
| WO | WO 2006/097484 A1 | 9/2006 |

OTHER PUBLICATIONS

U.S. Appl. No. 12/275,815, filed Nov. 21, 2008, Baillard, et al.

* cited by examiner

*Primary Examiner* — Timothy D Collins
*Assistant Examiner* — Steven Hawk
(74) *Attorney, Agent, or Firm* — Oblon, Spivak, McClelland, Maier & Neustadt, L.L.P.

(57) ABSTRACT

The present invention relates to an isostatic suspension for mounting a turbojet engine on a pylon of an aircraft, the turbojet engine comprising a front fan, an intermediate casing downstream of the fan with an outer shell and a hub interconnected by radial arms, and an exhaust casing with an outer shell on the same axis XX, the suspension comprising a front attachment on the intermediate casing, a rear attachment with at least two rear attachment links connected to the outer shell of the exhaust casing, a pair of thrust bars being fixed at their upstream ends to the hub of the intermediate casing. It is characterized in that the plane formed by the two links of the rear attachment is inclined with respect to the plane of the exhaust casing.

18 Claims, 6 Drawing Sheets

SUSPENSION FOR MOUNTING A TURBOJET ENGINE ON AN AIRCRAFT

The present invention relates to the field of turbojet engines, particularly turbojet engines with front fans, and their mounting on aircraft.

A front-fan turbojet engine comprises a large-diameter fan rotor housed in a casing on which the air intake duct is mounted. The casing is extended downstream by the primary flow casing which has a smaller diameter and is composed of various casings for compressors, a combustion chamber, turbines and exhaust. The air entering through the air intake duct is compressed as it passes through the fan rotor, and is then divided into two concentric cylindrical flows. In a known type of engine, the incoming flow is divided into a primary flow and a secondary flow. The latter passes around the engine and is ejected in a cold state, either as a separate flow or after mixing with the primary flow downstream of the turbine stages. The primary flow undergoes supplementary compression before being mixed with a fuel to produce hot gases in a combustion chamber. The hot gases are supplied to the subsequent turbine stages which rotate the fan about the engine axis and also rotate the air compression stages. The primary flow is then ejected to provide part of the thrust. Most of the thrust is produced by the secondary flow. The ratio of flow rates between the secondary and primary flows is called the bypass ratio. As the power of engines increases, it becomes necessary to design engines with a high bypass ratio for which the ratio between the diameters of the fan casing and the primary flow casing is large. The invention relates to multi-flow engines as well as bypass engines.

In a conventional mounting method, the engine is fixed to the aircraft on or under the wing, or to the fuselage, by means of a pylon. The pylon takes the form of a rigid elongate box structure which can transmit forces in three directions, namely the axial, lateral and vertical directions, between the engine and the aircraft structure, the axis being the same as that of the engine. The mounting of the engine on the pylon is located in two vertical planes, a first forward plane passing through the intermediate casing and the rear plane passing through the exhaust casing. These two casings are structural elements of the engine which support, for example, the front and rear bearings respectively. In the front plane, two different methods of mounting are currently used in civil aircraft; in one method, the outer shell of the intermediate casing is used, while in the other method the hub of this casing is used.

As regards the front mounting method, the attachment is made to the outer shell of the intermediate casing in a first embodiment of the present invention, while the attachment is made to the hub in a second embodiment.

In the case of an isostatic suspension, forces are transmitted by bars, links or equivalent components which connect the engine to the pylon and are attached by connections of the swivel joint type in such a way that they operate in tension or in compression only. The arrangement is designed to transmit forces in three directions, namely the axial direction Fx, the vertical direction Fz, and the lateral direction Fy, together with the torques in these three directions, namely Mx, My and Mz respectively. In addition to the attachments between the pylon and the intermediate and exhaust casings, the suspension also comprises thrust bars which connect the hub of the intermediate casing to the rear attachment or to the pylon by means of what is known as a pyramidal structure.

The problems associated with engine mounting are, on the one hand, distortions of the casing, including those due to the transmission of point forces resulting from the small area of the bar and clevis attachment points, and, on the other hand, problems arising from the offset of the thrust transmission in the pylon with respect to the thrust vector along the axis of the engine. The torque created by the two forces causes a flexion of the engine along its axis, which alters the clearances between the fixed and rotating parts, thus reducing performance levels and fuel efficiency. It also leads to wear of components by friction and a reduction in the service life of the engine. The phenomenon is even more noticeable, and the extent of deformation is greater, in engines with high bypass ratios and with a higher ratio between the diameters of the fan casing and the primary flow casing.

The present invention therefore proposes an isostatic suspension for mounting a front fan turbojet engine on a pylon, by means of which the local distortions of the frame can be reduced.

This object is achieved by means of an isostatic suspension for mounting a turbojet engine on an aircraft pylon, the turbojet engine comprising a front fan, an intermediate casing downstream of the fan with an outer shell and a hub interconnected by radial arms, and an exhaust casing with an outer casing on the same axis XX, the suspension comprising a front attachment on the intermediate casing, a rear attachment with at least two links connected to the outer shell of the exhaust casing, a pair of thrust bars being fixed at their upstream ends to the hub of the intermediate casing, characterized in that the plane formed by said two links of the rear attachment is inclined with respect to the plane of the exhaust casing.

The inclination of these links enables the forces and distortions in the front casings of the engine to be reduced, and thus enables the mass and behavior of large-diameter casings to be optimized.

Different embodiments can be devised in relation to this characteristic. The following characteristics can be present individually or in combination.

The rear attachment comprises a cross member, the two rear attachment links connecting the ends of the cross member to the outer shell of the exhaust casing.

The rear attachment comprises a link for taking up the torque Mx along the axis XX, this link being positioned between the two rear attachment links.

The two rear attachment links are connected to the exhaust casing by clevis joints whose lugs lie in a plane which is inclined with respect to the plane of the exhaust casing.

Said plane formed by the two rear attachment links cuts the axis of the turbojet engine in the proximity of the center of gravity of the engine. This arrangement is particularly advantageous for engines in which the center of gravity is positioned nearer to the rear end.

The two thrust bars are fixed at their downstream ends to said rear attachment cross member. More specifically, the two thrust bars are connected to the rear attachment by a rocking lever.

In another type of structure, the two thrust bars are fixed at their downstream ends to said box structure, more specifically to a pyramidal structure for attachment to the box structure.

More specifically, the plane of the thrust bars and the plane of the rear attachment links converge on the engine axis.

The plane of the thrust bars and the plane of the rear attachment links converge in the proximity of the engine axis at a point of convergence. In this case, the point of convergence is preferably located above the height of the engine axis XX and at a distance of less than a quarter of the fan diameter from this axis.

The front attachment comprises a cross member and two front attachment links connecting the member to the outer shell of the intermediate casing.

The front attachment comprises a link for taking up the torque Mx along the axis XX between the two front attachment links.

The front attachment includes a system for taking up the engine torque Mx along the axis XX by a bar of the boomerang type.

This arrangement creates a suspension system which causes less distortion in the front plane of the engine.

The solution according to the invention thus has advantages due to the absence, or at least the reduction, of distortion in the casings. The mass of the propulsion assembly can be reduced, for example as a result of the decrease in the mass of the front attachment which takes up very small amounts of force. As explained above, the reduction in distortion leads to improved fuel efficiency.

The term "point of convergence" is not to be interpreted as being limited to a strict convergence on the axis. The position of this point can vary over a certain vertical distance with respect to the engine axis, according to other loads such as the weight of the engine or the aerodynamic forces in the duct.

The torque links can be of a type known as boomerang links, described in the patent application filed by the present applicant under the number EP A 1 493 663.

Preferably, the suspension comprises two thrust bars which are connected at their downstream ends to the rear attachment by a rocking lever, or are connected directly to the pylon, or are connected to the front suspension beam in the case of an attachment of the hub type.

The invention will now be described in greater detail, with indication of any other characteristics and advantages, with reference to the appended drawings, in which.

Figure 1:
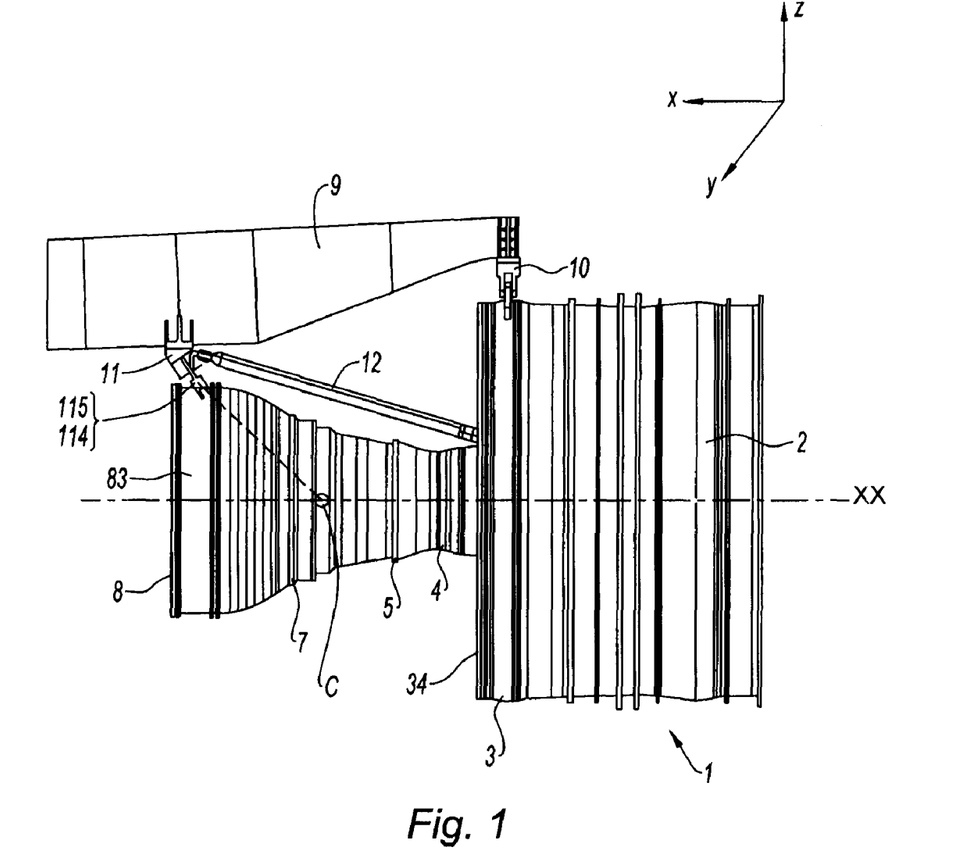
FIG. 1 is a side view of a turbojet engine mounted on a pylon according to an embodiment of the invention in which the plane of the rear attachment links is inclined with respect to the plane of the exhaust casing.

As shown in FIG. 1, the turbojet engine 1 is of the turbofan type, and its fan casing is shown at 2. Downstream of the casing 2, there is an intermediate casing 3, of which only the outer shell 34 is visible. The upstream end at which the air enters is on the right of the drawing in FIG. 1.

The casing 4 of the compression section is visible in a downstream position. This section communicates with the combustion chamber 5 which is of the annular type. The turbine stages 7 are located downstream of the combustion chamber. At the end of the engine there is an exhaust casing 8, which is a known type of structural component supporting the rear bearings. The coordinate system according to which the axes and components of the forces and moments are oriented comprises the axis Ox, parallel to the engine axis XX, the latter being assumed to be horizontal and extending from the upstream to the downstream end; the axis Oz is the vertical axis, and the axis Oy is the transverse axis.

The engine is fixed to the structure of the aircraft, on the wing or fuselage, using a pylon 9 in a known way. The general shape of the pylon is that of a rigid parallelepipedal box structure. It transmits any forces between the engine and the structure.

The suspension, which is the set of components or members for fixing the engine and for transmitting forces between the engine and the pylon, comprises a front attachment 10 between the outer shell 34 of the intermediate casing 3 and the pylon 9, and a rear attachment 11 between the outer shell 83 of the exhaust casing 8 and the pylon. The thrust is taken up or transmitted by means of two bars 12 and 12' which can be interconnected by a rocking lever at their downstream ends.

Figure 2:
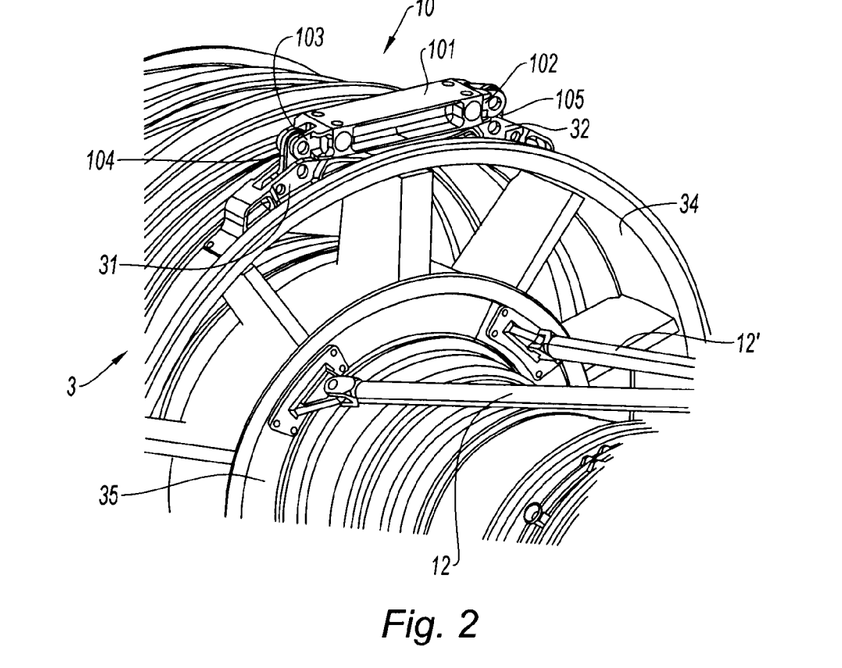
FIG. 2 shows the front suspension of the engine of FIG. 1 in isometric perspective, in a three-quarter rear view.
Figure 3:
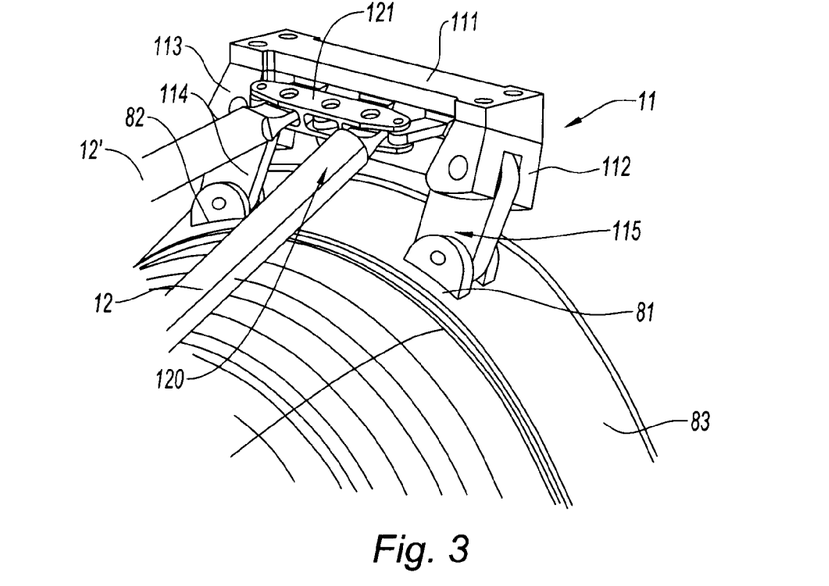
FIG. 3 shows the rear suspension of the engine of FIG. 1 in isometric perspective, in a three-quarter front view.

These three elements are shown in greater detail in FIGS. 2 and 3.

The front attachment 10 comprises a member 101 whose upper face is provided with means for fixing to the pylon 9, such as bolts, which are not shown in the drawings. The member is positioned transversely with respect to the axis XX. It comprises two terminal clevises, 102 and 103 respectively, in which two links 104 and 105 are pivoted. The opposite ends of these links are mounted in two clevises 31 and 32 fixed to the outer shell 34 of the intermediate casing 3. The links are mounted on the clevises by means of swivel joints in a known way. A shaft passes through the two lugs of the clevis and is fitted with a ring having a spherical surface. The link is also fitted with a ring having a spherical surface complementary to that of the ring on the shaft. Thus the link is free with respect to the three orthonormal directions and transmits only the tensile or compressive forces along its axis.

The set of two links 104 and 105 of the front suspension enables the forces Fy and Fz to be transmitted in the directions Oy and Oz to the front attachment.

The suspension can comprise a torque take-up link which is mounted between the two first links 104 and 105, and which is mounted between two clevises in the same way as the preceding two links. This arrangement would enable the torque Mx to be taken up.

In this example, the rear attachment 11 comprises a cross member 111 provided with means for fixing to the pylon 9, such as bolts, which are not shown in the drawings. The member comprises two end clevises 112 and 113 in which two rear attachment links 114 and 115 are mounted. The opposite ends of these links are mounted in two clevises 81 and 82 which are fixed to the outer shell 83 of the exhaust casing 8. The rear attachment links are mounted in the clevises by means of swivel joints as in the case of the front attachment. Depending on whether or not the torque Mx is to be taken up by the front suspension, a supplementary torque take-up link can be positioned between the two links 114 and 115.

Finally, the suspension comprises two thrust bars 12 and 12'. These two bars are fixed at their upstream ends to the hub 35 of the intermediate casing 3, at two points which are symmetrical with respect to the vertical plane passing through the axis XX, as shown in FIG. 2. At their downstream ends, the bars are mounted, in this example, on the two ends of a transverse bar 121. In this case also, the connections are of the clevis and swivel type. The transverse bar 121 forms a rocking lever 120 which is connected at its center by a pivot joint to the member 111. The rocking lever mounting, which is of a known type, makes it possible to balance the forces between the two bars 12 and 12' and to transmit the thrust in the axial direction. In the illustrated example, the rocking lever comprises two spare lateral attachments.

This mounting is therefore isostatic.

According to the invention, the plane formed by the two rear attachment links 114 and 115 is inclined in the upstream direction with respect to the plane of the exhaust casing 8. Its intersection C with the axis XX is located between the plane of the exhaust casing 8 and the intersection of the plane of the bars 12 with the axis XX. For this purpose, the links 114 and 115 are inclined with respect to the vertical plane (Oz, Oy) passing through the rear attachment 11.

Because of this arrangement, the resultant of the forces in the plane of the front attachment (Oz, Oy) is small. This reduces the distortion of the frame caused by deformations of the intermediate casing.

According to another characteristic of the invention, the clevises 81 and 82 on the outer shell 84 of the exhaust casing are inclined with respect to the vertical, the lugs lying in the extension of the axis of the links 114 and 115. The lugs are located in planes which are perpendicular with respect to the plane (Ox, Oz) and inclined with respect to the plane (Oy, Oz).

Figure 4:
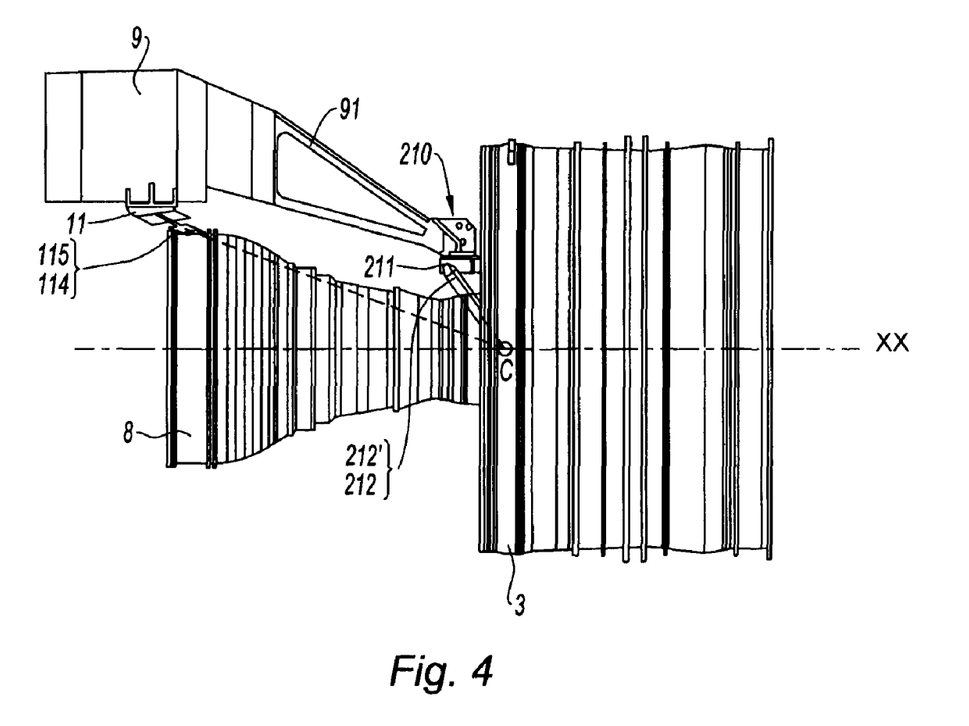
FIG. 4 is a side view of a turbojet engine mounted on a pylon according to another embodiment of the invention in which the plane of the rear attachment links and the plane of the thrust bars converge at a point on the engine axis.
Figure 5:
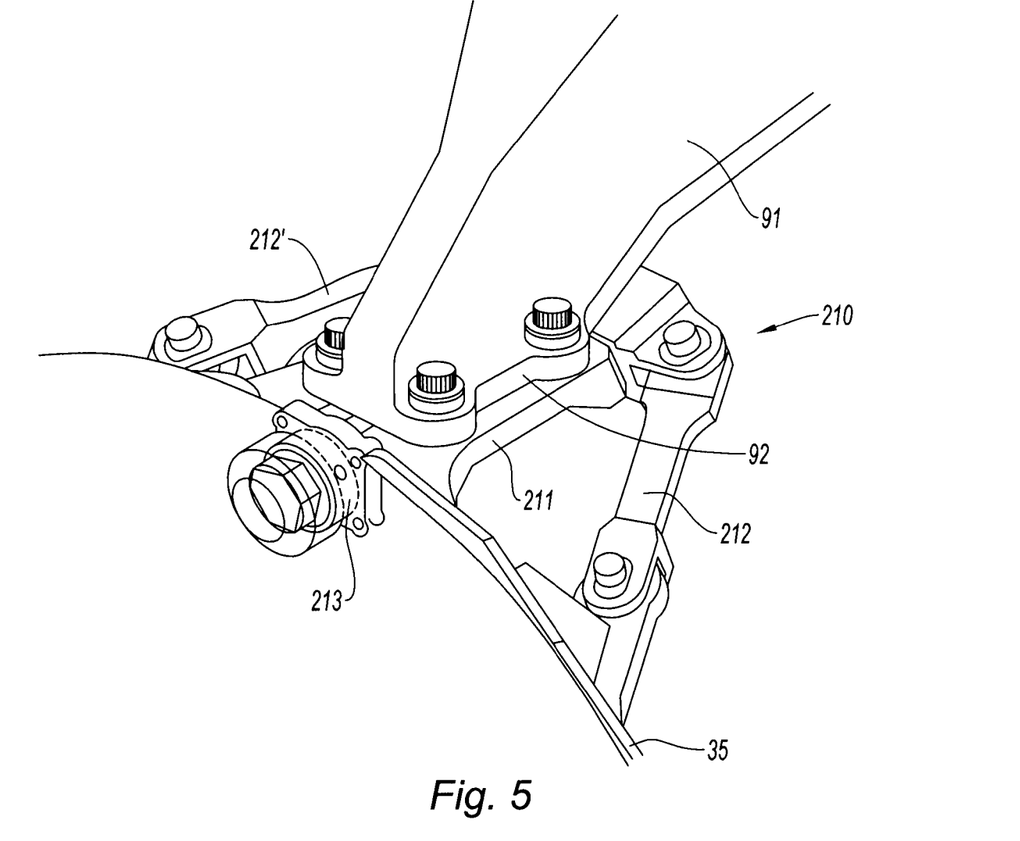
FIG. 5 shows the front attachment of the engine shown in FIG. 4.

In another embodiment of the invention, shown in FIGS. 4 and 5, the front suspension is of the type having an attachment to the hub, this attachment being known. The front attachment 210, shown in detail in FIG. 5, comprises a plate 211 which is fastened by bolts to a plate 92 fixed to a pyramidal structure 91 which extends the box structure 9. The plate is attached to the hub by thrust links 212 and 212', and also by a protrusion 213.

The bars 212 and 212' are fixed at their upstream ends to the hub 35 by a clevis and swivel connection and at their downstream ends to clevises formed on the plate 211. The two bars are positioned one on each side of the vertical plane passing through the engine axis. The forces in the plane (Oy, Oz) passing through the intermediate casing 3 are taken up by the protrusion 213 which is a shaft fixed to the plate 211, oriented axially and connected to the hub by a swivel which transmits only the forces in the directions Oy and Oz.

According to the invention, the plane of the rear attachment links 115 and 114 is inclined in the upstream direction and, in this embodiment, converges with the plane of the thrust bars 212 and 212' at a point C which is preferably located on the axis, but may be spaced slightly away from it.

Preferably, the point of convergence is located in the proximity of the center of gravity. In particular, this arrangement is effective for propulsion systems having a center of gravity displaced toward the rear.

With this convergence, a suspension system is created such that the thrust not taken up on the engine axis XX does not cause any deformation of the arms of the intermediate casing. It is possible to calculate the overall moments at the point of convergence with reference to the vertical plane of symmetry containing the engine axis XX. The rear links, the thrust bars and the thrust itself exert a lever arm moment of zero because of the nature of the point of convergence. The only force which may potentially exert a moment, because its lever arm with respect to the point of convergence is non-zero, is the force in the plane of the front suspension. However, the engine is balanced, and therefore the overall moments are equal to zero. The force in the plane of the front suspension is therefore zero, and the front casings undergo little deformation.

The solution according to the invention thus has advantages due to the absence, or at least the reduction, of distortion in the casings. The mass of the propulsion assembly can be reduced, for example as a result of the decrease in the mass of the rear attachment, which takes up very small amounts of force. As explained above, the reduction in distortion leads to improved fuel efficiency.

The term "point of convergence" is not to be interpreted as being limited to a strict convergence on the axis. The position of this point can vary over a certain vertical distance with respect to the engine axis, according to other loads such as the weight of the engine or the aerodynamic forces in the duct. This vertical distance is less than a quarter of the engine fan inlet diameter. In this case, the overall moments are not zero, but are close to zero.

Figure 6:
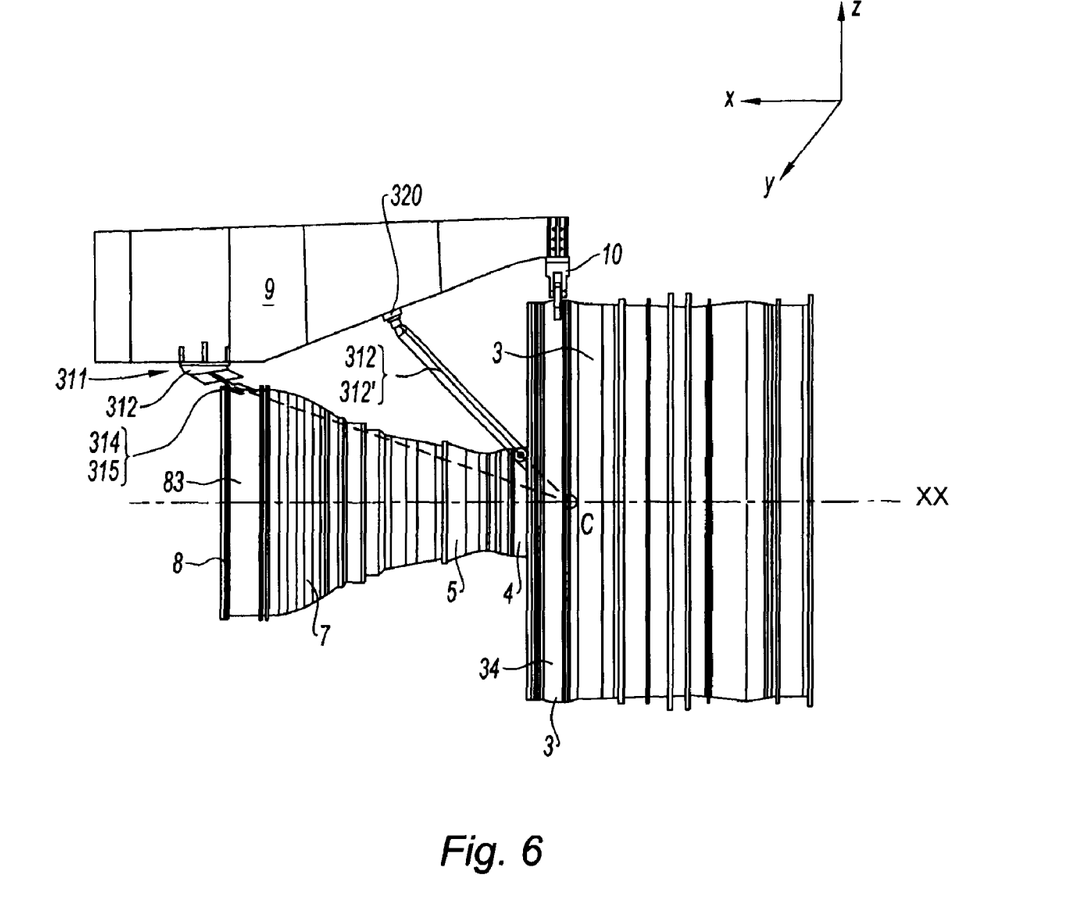
FIG. 6 is a side view of a turbojet engine mounted on a pylon according to another embodiment of the invention in which the plane of the rear attachment links and the plane of the thrust bars converge at a point on the engine axis, the thrust bars being fixed to the pylon.

In a variant shown in FIG. 6, the suspension is of the type with a front attachment to the fan casing, and the downstream ends of the thrust bars are connected directly to the box structure by a rocking lever.

The engine is mounted on the pylon 9 by a front attachment 10 on the outer shell 34 of the intermediate casing 3. This is the same kind of attachment as that of the variant of FIG. 2.

The rear attachment 311 connects the outer shell 83 of the exhaust casing to the pylon. It comprises two links 314 and 315 between a cross member 312 fastened to the pylon and clevises fixed to the outer shell 83. As in the other embodiments, the links 314 and 315 are mounted in such a way that they lie in the same plane which is inclined with respect to the plane (Oz, Oy) passing through the exhaust casing. Advantageously, the clevises for connection to the outer shell 83 are also inclined at the same angle as the links 314 and 315.

Figure 7:
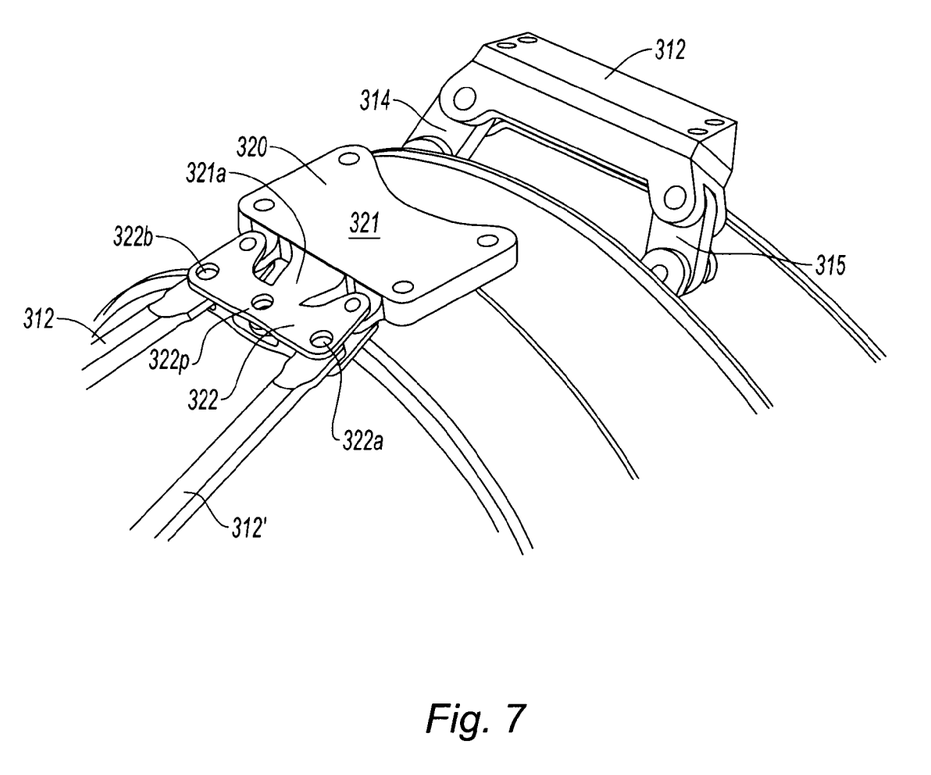
FIG. 7 shows the detail of the attachment of the thrust bars to the pylon in the embodiment of FIG. 6.

The two thrust bars 312 and 312' connect the hub of the intermediate casing 3 to the pylon 9. The upstream attachment of these bars to the hub 35 is the same as that shown in FIG. 2 for the bars 12 and 12'. The downstream ends of the two bars are fixed to the pylon 9 by means of a rocking lever 320. The rocking lever is shown in FIG. 7.

The two bars 312 and 312' are mounted by swivel joints 322a and 322b respectively to the transverse rocking lever 322 which is mounted by a pivot on a lug fixed to the member 321. The joints are not shown; only the apertures which house them are illustrated in order to make the drawing clearer. Spare joints are also provided in this example, but these are not what is proposed by the invention. The member 321 is bolted directly to the pylon. Because of this arrangement, the directions of the forces on the links 314 and 315 of the rear attachment on one hand, and the directions of the forces on the thrust bars 312 and 312' on the other hand, can be made to converge. These directions converge at a point C on the engine axis, or at least in the proximity of the engine axis.

The invention claimed is:

1. An isostatic suspension for mounting a turbojet engine on a pylon of an aircraft, the turbojet engine comprising a front fan, an intermediate casing downstream of the fan with an outer shell and a hub interconnected by radial arms, and an exhaust casing with an outer shell on the engine axis XX, the suspension comprising a front attachment on the intermediate casing, a rear attachment with at least two rear attachment links connected to the outer shell of the exhaust casing, a pair of thrust bars being fixed at their upstream ends to the hub of the intermediate casing, characterized in that the plane formed by the two links of the rear attachment is inclined with respect to a vertical plane of the exhaust casing.

2. The suspension as claimed in claim 1, wherein the rear attachment comprises a cross member, the two rear attachment links connecting the ends of the member to the outer shell of the exhaust casing.

3. The suspension as claimed in claim 2, wherein the rear attachment comprises a link for taking up the torque Mx along the engine axis XX, this link being positioned between the two rear attachment links.

4. The suspension as claimed in claim 2, wherein the two rear attachment links are connected to the exhaust casing by clevis joints whose lugs lie in a plane which is inclined with respect to the vertical plane of the exhaust casing.

5. The suspension as claimed in claim 1, wherein said plane formed by the two rear attachment links cuts the axis of the turbojet engine XX in the proximity of the center of gravity of the engine.

6. The suspension as claimed in claim 2, wherein the two thrust bars are fixed at their downstream ends to said cross member.

7. The suspension as claimed in claim 6, wherein the two thrust bars are connected to the rear attachment by a rocking lever.

8. The suspension as claimed in claim 1, wherein the downstream ends of the thrust bars are connected to the pylon.

9. The suspension as claimed in claim 8, wherein the thrust bars and the rear suspension links converge on, or in the proximity of, the engine axis XX at a point of convergence.

10. The suspension as claimed in claim 9, wherein the point of convergence is located above the height of the engine axis XX and at a distance of less than a quarter of the fan diameter from this axis.

11. The suspension as claimed in claim 1, wherein the two thrust bars are fixed at their downstream ends to the pylon by the front attachment.

12. The suspension as claimed in claim 11, wherein the front attachment is connected to the hub of the intermediate casing.

13. The suspension as claimed in claim 11, wherein the plane of the thrust bars and the plane of the two rear attachment links converge on, or in the proximity of, the engine axis XX at a point of convergence.

14. The suspension as claimed in claim 13, wherein the point of convergence is located above the height of the engine axis XX and at a distance of less than a quarter of the fan diameter from this axis.

15. The suspension as claimed in claim 1, wherein the front attachment comprises a cross member and two front attachment links connecting the member to the shell of the intermediate casing.

16. The suspension as claimed in claim 15, wherein the front attachment comprises a link for taking up the torque Mx along the engine axis XX, this link being positioned between the two front attachment links.

17. The suspension as claimed in either one of claims 15 or 16, wherein the front attachment has a system for taking up the engine torque Mx along the engine axis XX by means of a link of the boomerang type.

18. A turbojet engine for an aircraft, characterized in that it has a suspension as claimed in any one of claims 1 to 16.

* * * * *